Patented Dec. 8, 1925.

1,565,072

UNITED STATES PATENT OFFICE.

FRANK EDWARD ELMORE, OF BOXMOOR, ENGLAND, ASSIGNOR TO NIELS C. CHRISTEN-SEN, OF SALT LAKE CITY, UTAH.

TREATMENT OF ARGENTIFEROUS SULPHIDE ORES.

No Drawing. Application filed March 26, 1921. Serial No. 455,794.

*To all whom it may concern:*

Be it known that I, FRANK EDWARD ELMORE, a subject of the King of Great Britain, residing in Boxmoor, England, have invented certain new and useful Improvements in the Treatment of Argentiferous Sulphide Ores, of which the following is a specification.

In application for U. S. Letters Patent Serial No. 356,391, it has been shown that the extractability of the silver contained in lead-zinc sulphide ores by means of suitable solvents is enhanced if the ore be first heated under such conditions that the zinc sulphide remains substantially undecomposed.

By the present invention the beneficial effect of heat treatment upon the silver extraction is realized even if the ore be heated in presence of agents which cause much or the whole of the lead sulphide to become decomposed, or which at a suitable temperature cause more or less of the lead to be volatilized as chloride or oxy-chloride, the zinc sulphide in each case, however, remaining for the most part undecomposed.

By the present invention, therefore, the heat treatment consists in heating the ore in admixture with sodium chloride or other suitable halogen salt and in presence of air or other suitable oxidizing gas at any temperature from about 400° C. upwards, provided the zinc sulphide remains for the most part undecomposed. The ore thus treated is then treated with suitable solvents for extracting the silver from the argentiferous residue containing zinc sulphide.

Suitable solvents consist of hot, strong solutions of sodium chloride, calcium chloride or magnesium chloride containing relatively small proportions of acid chloride, namely, hydrogen chloride, a metallic chloride of an acid nature, or both hydrogen chloride and such metallic chloride. The preferred solvent consists of a hot, strong, acid solution of calcium or magnesium chloride containing about 35 per cent of $CaCl_2$ or $MgCl_2$ and a relatively small quantity of hydrochloric acid preferably not greatly in excess of that required to ensure the extraction of the silver and lead present.

The following are examples of the manner in which the invention may be performed.

*Example 1.*—A finely crushed argentiferous lead-zinc ore from Burmah is mixed with sodium chloride or other halogen salt and the mixture is heated in air at a relatively low temperature, say 400° to 500° C. Oxidation occurs; the lead sulphide is decomposed and the zinc sulphide remains for the most part unattached. The oxidized mixtuer is leached with a strong solution of sodium chloride, which extracts the lead salts along with a part of the silver and leaves a residue containing zinc sulphide and the balance of the silver with, in some cases, a small proportion of lead, apparently in the form of unattacked lead sulphide. According to the present invention the oxidized mixture obtained by heating the ore under these conditions, or the residue left after treatment with sodium chloride solution, is leached with one of the suitable solvents aforesaid and preferably with a solution of calcium or magnesium chloride containing about 35 per cent of $CaCl_2$ or $MgCl_2$ and a quantity of hydrochloric acid sufficient to extract the silver and convert into chloride any lead (apparently in the form of lead sulphide) present. A good extraction of the silver is thus effected. For example, Burmah ore mixed with 20 per cent of sodium chloride was heated for 1 hour at about 500° C., with access of air and occasional stirring; the product was leached with a saturated solution of sodium chloride, and the argentiferous residue, containing zinc sulphide and about 2 per cent of lead, was leached with the aforesaid solvent consisting of a 35 per cent solution of calcium chloride to which was added 2 per cent by volume of commercial hydrochloric acid. Over 85 per cent of the silver in the ore was thus extracted.

*Example 2.*—It is known that if finely crushed argentiferous lead-zinc sulphide ore be mixed with common salt and roasted at a relatively high temperature (say, at or above 861° C.), a substantial proportion of the lead is volatilized in the form of lead chloride or oxychloride along with small proportions of other metallic chlorides, whilst the balance of the lead remains along with the greater part of the zinc sulphide in the argentiferous residue. According to the present invention the residue obtained by heating the ore under these conditions is leached (if desired, after a preliminary wash with a limited quantity of cold water, to remove sodium salts) with one of the suitable solvents aforesaid, other than an acidified solution of sodium chloride, and preferably with a strong solution of calcium or magnesium chloride containing a quantity of hydrochloric acid not greatly in excess of that required to convert into cloride the quantity of lead present.

Whatever be the explanation of the effect of the heat-treatment, it has been found that if the treatment be omitted a relatively small proportion of the silver is extracted by means of the solvents hereinbefore referred to.

The fineness to which the ore should be crushed, the temperature and duration of the heat treatment required, and the strength and quantity of the solutions used vary to some extent with the nature of the ore and other circumstances, but may readily be ascertained beforehand by trial on a laboratory scale. In some cases it may be advisable to subject the ore to a preliminary concentration with the object of reducing the proportion of acid-consuming or other objectionable material therein.

Having thus described the nature of the said invention and the best means I know of carrying the same into practical effect, I claim:—

1. A process of treating argentiferous lead-zinc sulphide ores which consists in first heating the ore admixed with sodium chloride in presence of air at a temperature exceeding about 400° C. but not high enough to cause volatilization of lead as halogen compound, the zinc sulphide remaining for the most port unattacked, then extracting the oxidized mixture with a strong solution of sodium chloride and finally extracting the silver from the argentiferous residue with solvent as herein defined.

2. A process of treating argentiferous lead-zinc sulphide ores which consists in first heating the ore admixed with a halogen salt in presence of an oxidizing gas at a temperature exceeding about 400° C. but not high enough to cause volatilization of lead as halogen compound, the zinc sulphide remaining for the most part unattacked, and then extracting the silver from the oxidized mixture with a solution of an alkaline earth chloride containing acid chloride.

3. A process of treating argentiferous lead-zinc sulphide ores which consists in first heating the ore admixed with a halogen salt in presence of an oxidizing gas at a temperature exceeding about 400° C. but not high enough to cause volatilization of lead as halogen compounds, the zinc sulphide remaining for the most part unattacked, then extracting the oxidized mixture with a strong solution of sodium chloride and finally extracting the silver from the argentiferous residue with a solution of an alkaline earth chloride containing acid chloride.

4. A process of treating argentiferous lead-zinc sulphide ores which consists in first heating the ore admixed with sodium chloride in presence of air at a temperature exceeding about 400° C. but not high enough to cause volatilization of lead as halogen compound, the zinc sulphide remaining for the most part unattacked, and then extracting the silver from the oxidized mixture with a solution of an alkaline earth chloride containing acid chloride.

5. A process of treating argentiferous lead-zinc sulphide ores which consists in first heating the ore admixed with sodium chloride in presence of air at a temperature exceeding about 400° C. but not high enough to cause volatilization of lead as halogen compound, the zinc sulphide remaining for the most part unattacked, then extracting the oxidized mixture with a strong solution of sodium chloride and finally extracting the silver from the argentiferous residue with a solution of an alkaline earth chloride containing acid chloride.

6. A process of treating argentiferous lead-zinc sulphide ores which consists in first heating the ore admixed with a halogen salt in presence of an oxidizing gas at a temperature exceeding about 400° C. but not high enough to cause volatilization of lead as halogen compound, the zinc sulphide remaining for the most part unattacked, and then extracting the silver from the oxidized mixture with a solution of an alkaline earth chloride containing hydrogen chloride.

7. A process of treating argentiferous lead-zinc sulphide ores which consists in first heating the ore admixed with a halogen salt in presence of an oxidizing gas at a temperature exceeding about 400° C. but not high enough to cause volatilization of lead as halogen compound, the zinc sulphide remaining for the most part unattacked, then extracting the oxidized mixture with a strong solution of sodium chloride, and finally extracting the silver from the argentiferous residue with a solution of an alkaline earth chloride containing hydrogen chloride.

8. A process of treating argentiferous lead-zinc sulphide ores which consists in first heating the ore admixed with sodium chloride in presence of air at a temperature exceeding about 400° C. but not high enough to cause volatilization of lead as halogen compound, the zinc sulphide remaining for the most part unattacked, and then extracting the silver from the oxidized mixture with a solution of an alkaline earth chloride containing hydrogen chloride.

9. A process of a treating argentiferous lead-zinc sulphide ores which consists in first heating the ore admixed with sodium chloride in presence of air at a temperature exceeding about 400° C. but not high enough to cause volatilization of lead as halogen compound, the zinc sulphide remaining for the most part unattacked, then extracting the oxidized mixture with a strong solution of sodium chloride and finally extracting the silver from the argentiferous residue with a solution of an alkaline earth chloride containing hydrogen chloride.

In testimony whereof I have signed my name to this specification.

FRANK EDWARD ELMORE.